(12) United States Patent
Fitzpatrick

(10) Patent No.: US 12,365,423 B2
(45) Date of Patent: Jul. 22, 2025

(54) APPARATUS FOR GAS STORAGE AND TRANSPORT

(71) Applicant: Global Hydrogen Ventures Pty Ltd, West Perth (AU)

(72) Inventor: Patrick John Fitzpatrick, Calgary (CA)

(73) Assignee: GLOBAL HYDROGEN VENTURES PTY LTD, Claremont (AU)

( * ) Notice: Subject to any disclaimer, the term of this patent is extended or adjusted under 35 U.S.C. 154(b) by 766 days.

(21) Appl. No.: 17/548,876

(22) Filed: Dec. 13, 2021

(65) Prior Publication Data

US 2022/0185432 A1 Jun. 16, 2022

Related U.S. Application Data

(60) Provisional application No. 63/124,325, filed on Dec. 11, 2020.

(51) Int. Cl.
*B63B 25/14* (2006.01)
*F17C 1/00* (2006.01)
*F17C 1/10* (2006.01)

(52) U.S. Cl.
CPC ............. *B63B 25/14* (2013.01); *F17C 1/002* (2013.01); *F17C 1/10* (2013.01);
(Continued)

(58) Field of Classification Search
CPC .. B63B 25/14; F17C 1/002; F17C 1/10; F17C 2201/0109; F17C 2201/052;
(Continued)

(56) References Cited

U.S. PATENT DOCUMENTS 2,810,265 A 10/1957 Beckwith
3,828,708 A 8/1974 Gerwick, Jr. et al.
(Continued)

FOREIGN PATENT DOCUMENTS

CA 2283008 A1 3/2001
CN 105953068 A 9/2016
(Continued)

OTHER PUBLICATIONS

European Patent Office, "European Search Report for European Patent Application No. 17838251.1", Feb. 26, 2020.
(Continued)

*Primary Examiner* — Andrew Polay
(74) *Attorney, Agent, or Firm* — James F. Lea, III; Gable Gotwals

(57) ABSTRACT

A gas transport vessel having a hull and a tank longitudinally received in the hull and method of constructing the tank within the hull. The vessel is designed to transport fluids, such as hydrogen or other gases and liquids. The tank has a plurality of layers that are unconnected to adjacent layers. The tank contacts the vessel at a top and bottom. The top connection, for example a connection to deck structure, supports the tank for preventing sagging. The tank may be substantially the length of the ship and located between a forward and a rearward bulkhead. Two tanks may placed adjacent one another separated by a longitudinal bulkhead. Each layer has a forward and rearward end cap constructed of multiple frusto-conical sections. A space is provided on sides of the tank to permit expansion. The tank is integral with ship structure, thereby providing additional strength to the vessel.

1 Claim, 7 Drawing Sheets

(52) U.S. Cl.
CPC ..... *F17C 2201/0109* (2013.01); *F17C 2201/052* (2013.01); *F17C 2203/0624* (2013.01); *F17C 2203/068* (2013.01); *F17C 2205/013* (2013.01); *F17C 2270/0105* (2013.01)

(58) Field of Classification Search
CPC ........ F17C 2203/0624; F17C 2203/068; F17C 2205/013; F17C 2270/0105
See application file for complete search history.

(56) References Cited

U.S. PATENT DOCUMENTS

| | | | |
|---|---|---|---|
| 3,830,180 | A | 8/1974 | Bolton |
| 3,863,460 | A | 2/1975 | Straile et al. |
| 3,875,886 | A | 4/1975 | Glasfeld et al. |
| 3,937,353 | A | 2/1976 | Becker et al. |
| 4,098,426 | A * | 7/1978 | Gerhard ............... F17C 1/12 220/592.2 |
| 4,241,683 | A | 12/1980 | Conway |
| 5,450,806 | A | 9/1995 | Jean |
| 5,803,005 | A | 9/1998 | Stenning et al. |
| 5,839,383 | A | 11/1998 | Stenning et al. |
| 6,003,460 | A | 12/1999 | Stenning et al. |
| 6,240,868 | B1 | 6/2001 | Fitzpatrick et al. |
| 6,584,781 | B2 | 7/2003 | Bishop et al. |
| 8,091,495 | B2 | 1/2012 | Donnelly et al. |
| 9,376,049 | B2 | 6/2016 | Campbell |
| 9,759,379 | B2 | 9/2017 | Fitzpatrick |
| 9,975,609 | B2 | 5/2018 | Fitzpatrick et al. |
| 10,752,324 | B2 | 8/2020 | Fitzpatrick |
| 2004/0216656 | A1 | 11/2004 | Fitzpatrick et al. |
| 2007/0014636 | A1 | 1/2007 | Breivik et al. |
| 2009/0107853 | A1 | 4/2009 | Tan et al. |
| 2010/0050925 | A1 | 3/2010 | Donnelley et al. |
| 2010/0058780 | A1 | 3/2010 | Yoo et al. |
| 2012/0138153 | A1 | 6/2012 | Fitzpatrick |
| 2015/0308619 | A1 | 10/2015 | Nettis et al. |
| 2015/0330569 | A1 | 11/2015 | Fitzpatrick |
| 2017/0234487 | A1 | 8/2017 | Shima et al. |
| 2017/0002762 | A1 | 9/2017 | Yuasa |
| 2017/0276286 | A1 * | 9/2017 | Yuasa ............... F17C 13/001 |
| 2018/0238491 | A1 | 8/2018 | Imai |
| 2020/0011481 | A1 | 1/2020 | Fitzpatrick |
| 2020/0011483 | A1 | 1/2020 | Alzaydi |

FOREIGN PATENT DOCUMENTS

| | | | |
|---|---|---|---|
| EP | 0767338 | | 4/1997 |
| EP | 2179889 | A1 | 4/2010 |
| EP | 2829467 | A1 | 1/2015 |
| JP | 2013184504 | A | 9/2013 |
| KR | 1020170055309 | A | 5/2017 |
| WO | WO-2007148982 | A1 * | 12/2007 ............... F17C 1/08 |
| WO | 2011159170 | A1 | 12/2011 |
| WO | 2013083166 | A1 | 6/2013 |
| WO | 2021231647 | A1 | 11/2021 |

OTHER PUBLICATIONS

ISA/CA, "International Search Report for PCT/CA2017/050928", Nov. 7, 2017.
ISA/CA, International Search Report and Written Opinion for PCT/CA2021/051791, published Mar. 14, 2022.
European Patent Office, "European Search Report for EPO Patent Application No. 29101776.1", Oct. 28, 2024, Publisher: EPO.
Korean Patent Office, "Oct. 31, 2024 Office Action for KR 10-2023-7023353", Oct. 31, 2024.
Mahadevan et al, "IS 2825 (1969): Code for unfired pressure vessels Section I", XP093216061, Mar. 31, 1971, pp. 1-289, Publisher: https://law.resource.org/pub/in/bis/s08/is.2825.1969.pdf, Published in: New Delhi, IN.

* cited by examiner

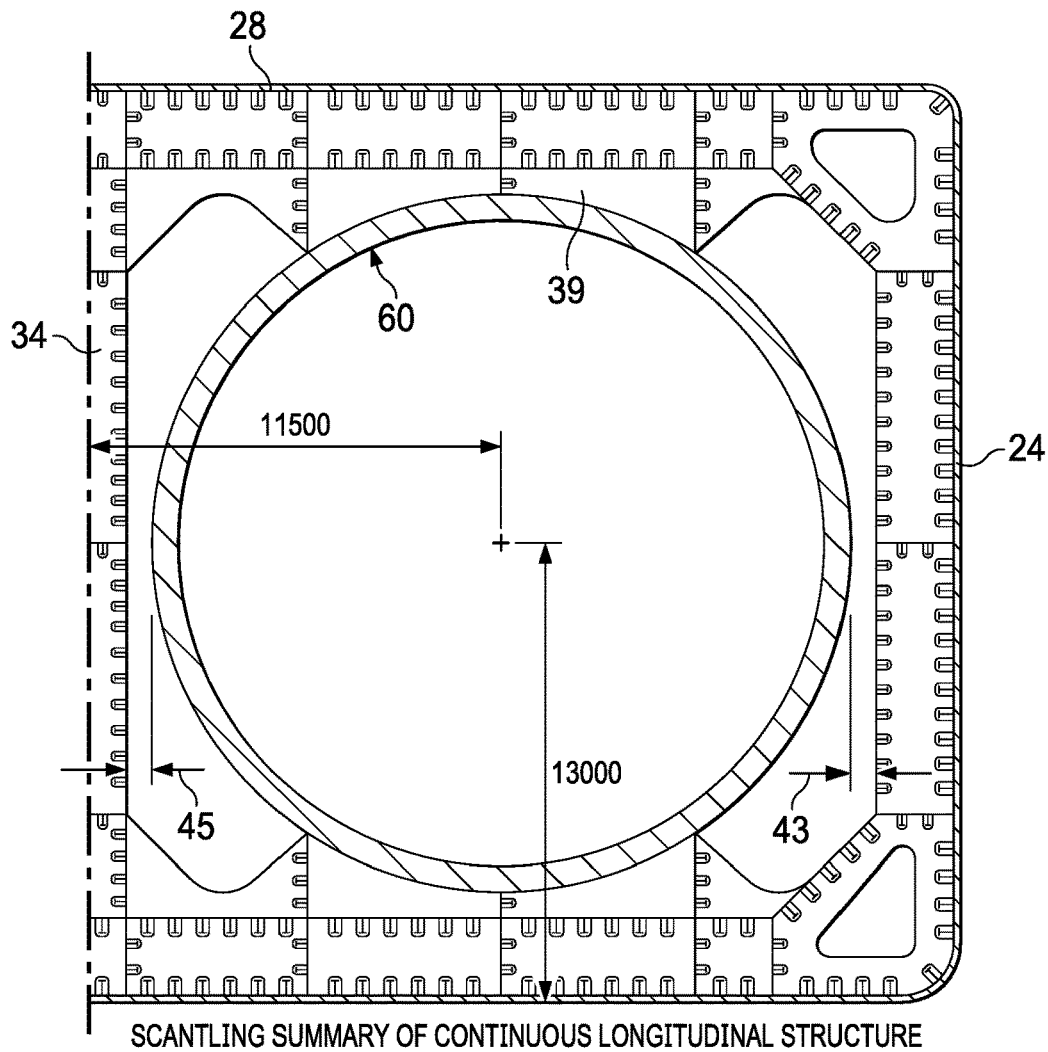

SCANTLING SUMMARY OF CONTINUOUS LONGITUDINAL STRUCTURE

1) BOTTOM LONGITUDINAL STIFFENERS : W:400x12 FF: 175x16 "T"
2) SIDE LONGITUDINAL STIFFENERS : W:375x12 FF: 150x14 "T"
3) DECK LONGITUDINAL STIFFENERS : W:250x10 FF: 100x11 "T"
4) DOUBLE BOTTOM LONGITUDINAL STIFFENERS : W:375x12 FF: 150x16 "T"
5) LONGITUDINAL WTBHD STIFFENERS : W:300x10 FF: 100x12 "T"
6) DECK PLATE : 14mm
7) SIDE SHELL PLATE : 13mm
8) BOTTOM SHELL PLATE : 19mm
9) LONGITUDINAL WTBHD PLATE : 12mm
10) TRANSVERSE WTBHD PLATE : 12mm
11) DOUBLE BOTTOM PLATE : 15mm
12) INNER SIDE SHELL PLATE : 12mm
13) INNER TOP DECK PLATE : 10mm
14) BOTTOM GIRDER : 2000x20 PL
15) SIDE STRINGER : 2000x16 PL
16) DECK GIRDER : 2000x20 PL
17) GIRDER AND STRINGER LONGITUDINAL STIFFENERS : W:300x10 FF: 100x12 "T"

FIG. 7

APPARATUS FOR GAS STORAGE AND TRANSPORT

CROSS REFERENCE TO RELATED APPLICATIONS

This application claims the priority of U.S. Provisional Patent Application No. 63/124,325 titled "APPARATUS FOR GAS STORAGE AND TRANSPORT," filed Dec. 11, 2020, the contents of which are hereby incorporated by reference.

FIELD OF THE INVENTION

The invention relates to an apparatus and method for the storage and transport of fluids, i.e., gases and liquids, such as hydrogen and natural gas transport by ship or by barge.

BACKGROUND OF THE INVENTION

Hydrogen is becoming an important fuel to reduce carbon dioxide emissions. There are locations where hydrogen can be produced at a much lower cost than where the hydrogen is demanded. For example, Australia can produce hydrogen at a lower cost than Japan. This separation of low-cost supply from demand by a body of water creates a need for ships capable of transporting hydrogen. The large-scale transport of hydrogen by sea will be an important part of the future hydrogen ecosystem just as natural gas transport by ship is a large part of the existing natural gas ecosystem.

There are known methods of transporting natural gas across bodies of water including for example, through subsea pipelines, by LNG ships as liquefied natural gas or by CNG ships as compressed natural gas (CNG). There are other known means such as converting the gas to gas hydrates or to a diesel-like liquid (GTL) and shipping the hydrates or GTL by ship. Currently, virtually all transport of natural gas across bodies of water is carried out by either subsea pipelines or LNG ships.

Hydrogen presents some unique challenges for large-scale shipment. Hydrogen is extremely light and requires either liquefaction or compression to increase its density for shipping. Liquefaction requires the hydrogen to be cooled to about −253 degrees centigrade. This is much colder than required for liquifying natural gas and is near absolute zero (−273° C.). This extremely cold temperature requires costly liquefaction processes and costly containment systems. Compression of hydrogen is well known and most hydrogen is transported as compressed gas, not liquified. The containers for compressed hydrogen are typically either steel or composite. Steel containers are relatively less expensive than composite containers but are significantly heavier. For road transport the weight of the container is critically important but for ship transport the weight penalty for steel is less critical. One of the main concerns with shipping compressed hydrogen in steel is that the hydrogen molecule is so small it can enter the steel structure and over time cause the steel to become less ductile. This process is known as embrittlement. There are established methods of preventing embrittlement such as keeping the stresses low or lining the steel with a material that is resistant to hydrogen embrittlement.

The terrestrial transport of compressed and liquified hydrogen by truck is well known. There are existing hydrogen fuel stations, primarily for dedicated fleets of hydrogen fueled commercial vehicles. The large-scale transport of hydrogen by ship is not yet established but it is an emerging industry.

One of the major impediments to shipping compressed hydrogen by sea is the cost of a suitable hydrogen containment system that is suited to ship or barge transport. Thus, there is an ongoing need to design storage systems for compressed hydrogen that can contain large quantities of hydrogen and that are particularly suited for installation on or within ships and barges in a way that reduces the overall cost of the compressed hydrogen (C—H2) ship or barge. It is an object of the present invention to reduce the cost of ships or barges designed to carry compressed hydrogen and other gases.

A cost-effective hydrogen carrying ship would greatly enhance the economic feasibility of shipping large quantities of compressed hydrogen.

SUMMARY OF THE INVENTION

The invention relates particularly to the marine gas transportation of non-liquefied compressed hydrogen although it could be used to transport other gases. The invention is capable of carrying natural gases, pure gases, such as hydrogen, or a combination of liquids and gases, such as rich natural gases with heavier hydrocarbons being liquid. The invention can also carry a combination of liquids and gas such as oil and natural gas, e.g., well fluids.

In one embodiment, the invention of the application embodies large storage tank(s) contained with a hold of a ship or barge. A preferred storage system is particularly adapted for the transportation of large quantities of compressed fluids including mixtures of gases and liquids. It is beneficial to store the compressed fluid in a large tank to minimize the internal surfaces that would need to be protected from corrosive fluids and embrittlement from gaseous hydrogen. The walls of a tank used to store high pressure fluids must become increasingly thick as the size of the tank increases. Also, a large thick-wall tank has to be supported and contained within the hull of the ship or barge. Mounting a large, heavy tank on the top deck of a barge or a ship may create stability concerns since a deck mounted heavy tank raises a center of gravity of the system. Therefore, this invention considers that the cargo tank is enclosed within the hull of the ship or barge. High pressure tanks are typically cylindrical in cross-section because a cylinder has less maximum stress than a square or rectangular shape of the same volumetric dimensions.

The largest possible cylindrical tank in a ship is bound by the ship dimensions. To allow a largest possible tank to be contained within the cargo area of the ship there can be no transverse bulkheads. To construct such a large diameter cylinder from a single plate of steel would require a plate thickness that would be exceedingly difficult to produce and to bend into a cylindrical shape. Therefore, two main technical issues that must be solved relate to:
  1. How to design and construct a very thick wall tank using unconnected thin plates.
  2. How to support very heavy large tank(s) efficiently within a vessel structure in such a way that prevents the tank expansion caused by pressurization from damaging the ship structure.

The invention of the application solves each of these technical issues in a novel way. Hereinafter the description will focus on a ship application to carry compressed hydrogen. However, the invention could also be employed to carry other gases or a mixture of gas and liquid. The tank of the invention may also be deployed within the hold of a barge or other floating structure.

In a preferred embodiment, the cargo area of a ship is divided into 2 long cargo areas separated by a double-walled longitudinal bulkhead. There are no transverse bulkheads in the cargo area. There is one large cargo tank situated in each of the two cargo holds. In another embodiment, a single tank is contained within a hull defining a single hold.

The tank is constructed of several unconnected layers, e.g., 3 to 10 layers. In the present invention, there is no need to ensure 100% metal to metal contact between layers. It is only important for the layers to be touching over most of the surface. The amount of contact achieved by simply placing one plate on top of the other is enough to ensure the stresses in all layers will be within the allowable limits. The invention of the application greatly simplifies the construction process and relies on plastic-elastic material properties to ensure that all layers work together to resist the stresses caused by the internal pressure.

One significant further advantage of a tank made from multiple discrete layers is that, should a crack form in one layer, it will not naturally proceed through to the adjacent layer. This greatly improves the safety of the tank compared to a similar sized tank comprised of a single thick wall.

The innermost layer is designed to resist hydrogen embrittlement or corrosion caused by other gases. The material properties of this inner layer will be determined by the fluids to be contained in the cargo tanks. The subsequent layers are designed based on constructability and manufacturing capability. In one example, the proposed cargo is hydrogen. Therefore, an example first innermost layer is a stainless steel, aluminum or plastic layer capable of resisting hydrogen embrittlement. Subsequent layers could be made from a high strength carbon steel.

One serious technical challenge in constructing such a large tank with a series of nested thin layers is that the layers may sag under their own weight. In one embodiment, the sagging of the plates is prevented by welding the outermost layer to structure of the ship, such as the top deck girders of the ship. This supports the outermost layer and prevents it from sagging. Since the top layer does not sag the inner layers cannot deform and sag as the inner layers are nested within the outer layer whose geometry is constrained, i.e., the outer layer is prevented from sagging by being attached to the top deck.

Another technical challenge is to prevent the tank from damaging the ship hull as it expands during pressurization. To prevent this a gap is left between the side shell of the ship and the tank.

Another technical challenge is to develop a tank end or head that can be easily constructed. Typically, the heads of a pressure cylinder are either spherical or hemispherical. For a large diameter tank, the construction of such a head would be difficult and expensive. To overcome this challenge the tank ends or heads are constructed with conical sections allowing them to be constructed using single curvature plate in multiple layers. This greatly simplifies construction and reduces cost.

The preferred embodiment described below is a ship with a cargo hold separated by a longitudinal bulkhead into port and starboard cargo sections each with a single tank. For a smaller ship or barge in is possible to have a single cargo hold, not separated by a longitudinal bulkhead and one tank contained with the cargo hold.

BRIEF DESCRIPTION OF THE DRAWINGS

FIG. 7 is an enlarged alternative cross-sectional view of FIG. 3 showing an expansion space between each side of the tank and ship structure;

DETAILED DESCRIPTION OF THE PREFERRED EMBODIMENTS

Figure 1:
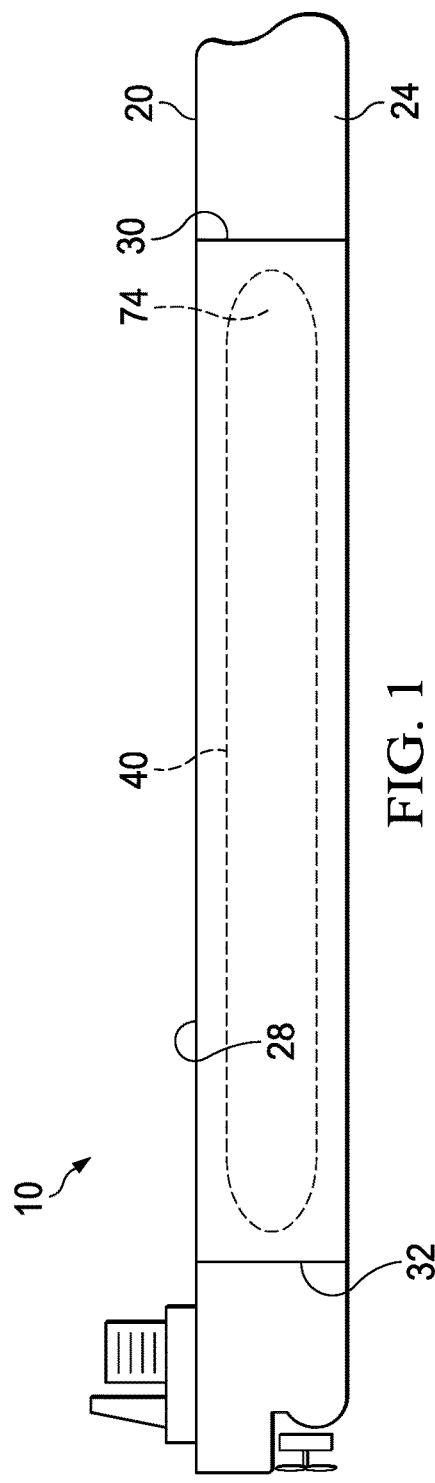
FIG. 1 is a side elevation view of a schematic of a ship containing tanks.
Figure 2:
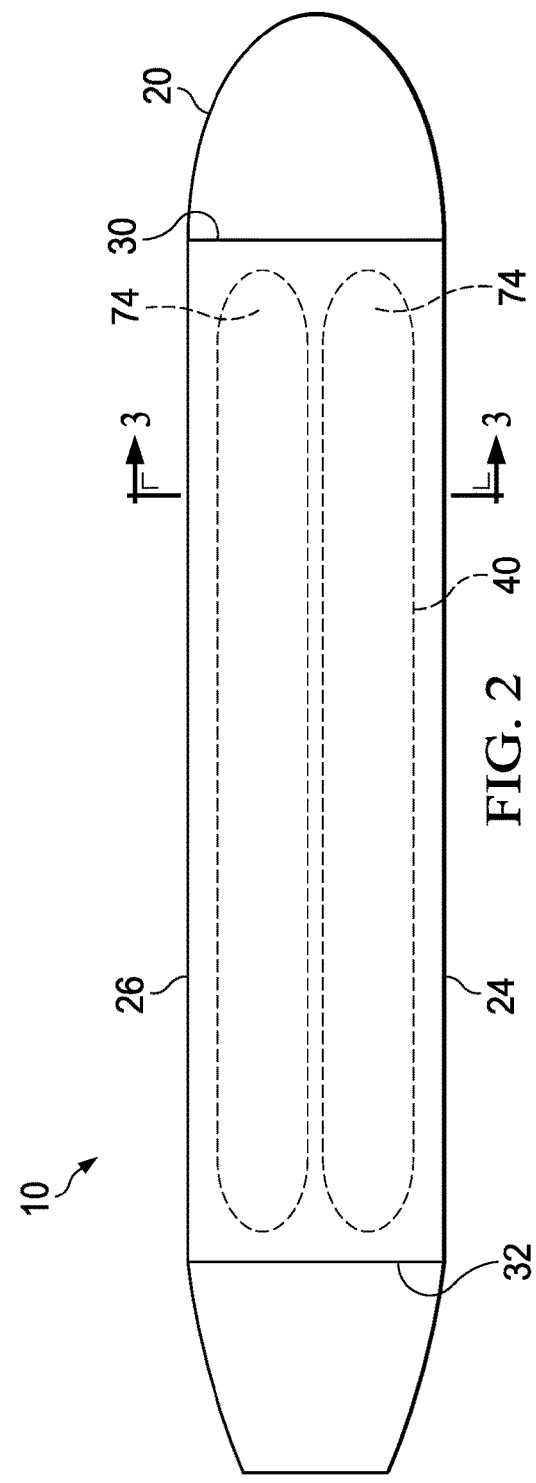
FIG. 2 is a top plan view of a schematic of the ship of FIG. 1 showing side-by-side tanks.
Figure 3:
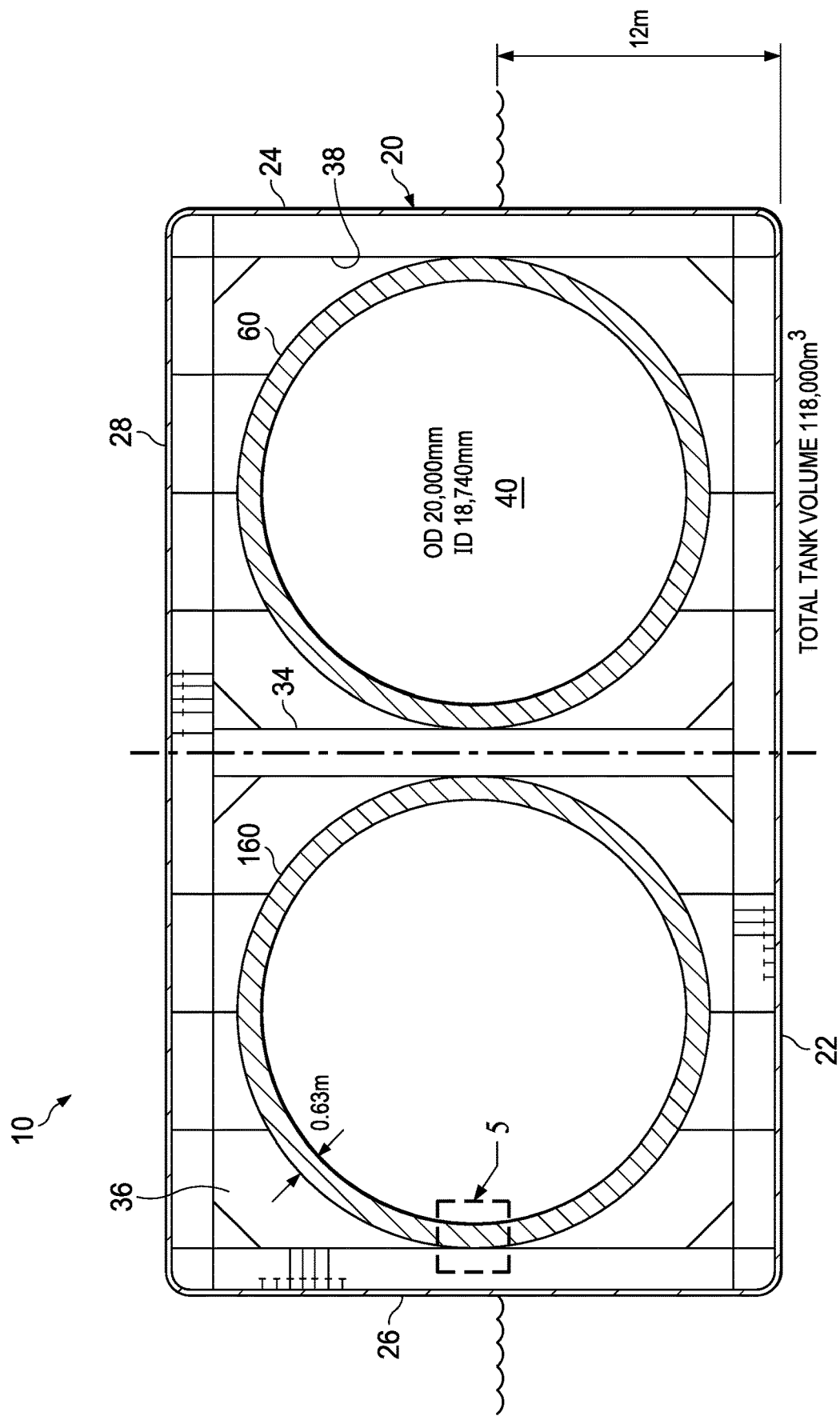
FIG. 3 is a cross-sectional view of the ship and tanks of FIGS. 1 and 2 taken along lines 3-3 of FIG. 2.

Referring now to the Figures, shown is gas transport vessel 10. Gas transport vessel 10 is made up of ship structure including a hull 20. Hull 20 includes bottom shell portion 22, starboard shell portion 24, and port shell portion 26. Upper deck 28 spans between starboard shell portion 24 and port shell portion 26. Forward bulkhead 30 is located within hull 20 and rearward bulkhead 32 is located within hull 20.

Hull 20 may be divided lengthwise by longitudinal bulkhead 34. Longitudinal bulkhead 34 separates a port hold 36 and a starboard hold 38. Port hold 36 and starboard hold 38 are located between forward bulkhead 30 and rearward bulkhead 32. Starboard tank 40 is located in starboard hold 38. Starboard tank 40 is constructed of multiple layers. In one embodiment, starboard tank 40 is constructed of six layers, i.e., outer layer 42, second layer 44, third layer 46, fourth layer 48, fifth layer 50, sixth layer 52, and liner layer 54, (see, e.g., FIG. 5) wherein each of layers 42, 44, 46, 48, 50, 52, and 54 are made up of the following segments. Other numbers of layers may be provided, e.g., 3 to 10 layers.

Figure 4:
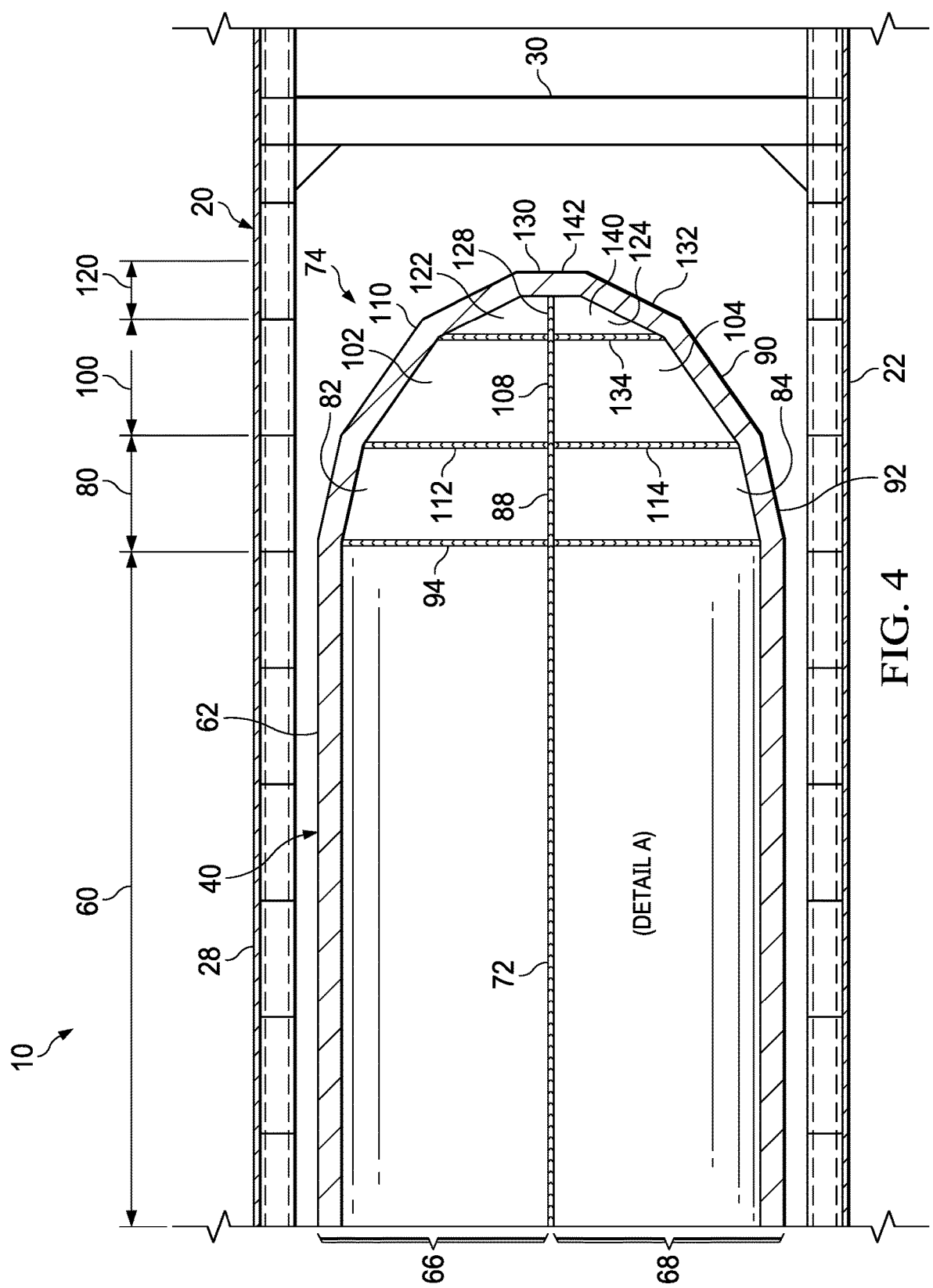
FIG. 4 is an enlarged side elevation view of a forward end of the tank of FIG. 1.

Each of layers 42, 44, 46, 48, 50, 52, and 54 include body segment 40 (see, e.g., FIG. 4). Body segment 60 has a forward end 62 and a rearward end 64. Body segment 60 is made up of upper semi-cylindrical portion 66 and lower semi-cylindrical portion 68. Upper semi-cylindrical portion 66 and lower semi-cylindrical portion 68 are affixed to one another with a port body seam weld 70 and a starboard body seam weld 72.

Forward end cap 74 is affixed to forward end 62 of body segment 60. Forward end cap 74 is comprised of the following frusto-conical segments and a cap. Other constructions are also possible, such as a dome construction.

Referring now to FIG. 4, each of layers 42, 44, 46, 48, 50, 52, 54 have a first frusto-conical segment 80 having an upper portion 82 and a lower portion 84 connected to one another via a first forward port seam weld (not visible in FIG. 4) and a first forward starboard seam weld 88. Upper portion 82 and lower portion 84 are preferably frusto-conical, single curvature layers to facilitate ease of construction. First forward frusto-conical segment has a forward edge 90 and a rearward edge 92. Rearward edge 92 is affixed to forward end 62 of body segment 60 by a first forward circumferential weld 94.

Each of layers 42, 44, 46, 48, 50, 52, 54 define a second forward frusto-conical segment 100 having an upper portion 102 and a lower portion 104 connected to one another via a second forward port seam weld 106 and a second forward starboard seam weld 108. Upper portion 102 and lower portion 104 are preferably frusto-conical, single curvature layers to facilitate ease of construction. Second forward frusto-conical segment 100 has a forward edge 110 and a rearward edge 112. The rearward edge 112 of the second forward frusto-conical segment 100 is affixed to the forward edge 90 of the first frusto-conical segment 80 via a second forward circumferential weld 114.

Each of layers 42, 44, 46, 48, 50, 52, 54 define a third forward frusto-conical segment 120 having an upper portion 122 and a lower portion 124 connected to one another via a third forward port seam weld 126 and a third forward starboard seam weld 128. Upper portion 122 and lower portion 124 are preferably frusto-conical, single curvature layers to facilitate ease of construction. Third forward frusto-conical segment 120 has a forward edge 130 and a rearward edge 132. Rearward edge 132 of third forward frusto-conical segment 120 is affixed to forward edge 110 of second frusto-conical segment 100 via a third forward circumferential weld 134.

Each of layers 42, 44, 46, 48, 50, 52, 54 define a front plate 140 affixed to forward edge 130 of third forward frusto-conical segment 120 with a fourth circumferential weld 142.

A rearward end cap (not visible in FIG. 4) is affixed to rearward end 64 of body 60. The rearward end cap is preferably made up of multiple layers of frusto-conical segments and an end cap similar to forward end cap 74, described above.

A port tank 160 is located in port hold 36. Port tank 160 preferably has a similar construction to that of starboard tank 40, discussed above.

The ship 10 and the cargo containment system are sized in accordance with ABS rules. The containment system is designed under the Limit States provisions of the ABS Guidelines for CNG Ships.

In one embodiment, the cargo tanks 40, 160 are 20 meters in diameter with a wall thickness of 630 mm constructed in 6 layers of 100 mm and one inner layer of 30 mm. Other wall thicknesses are possible depending on the design conditions, tank size and cargo. Example wall thicknesses range from 20 mm to 200 mm and overall thickness range from 200 mm to 900 mm. In greater detail, although wall thicknesses will depend on the size and operating conditions of the tanks, contemplated wall thicknesses for each layer are in the range of 20 to 200 mm, more particularly 70 to 150 mm, and more particularly 100 to 120 mm. Overall thicknesses range from 200 to 900 mm, more particularly 400 to 700 mm, and more particularly 500 mm to 600 mm. Other thicknesses may be necessary depending on design considerations.

Figure 5:
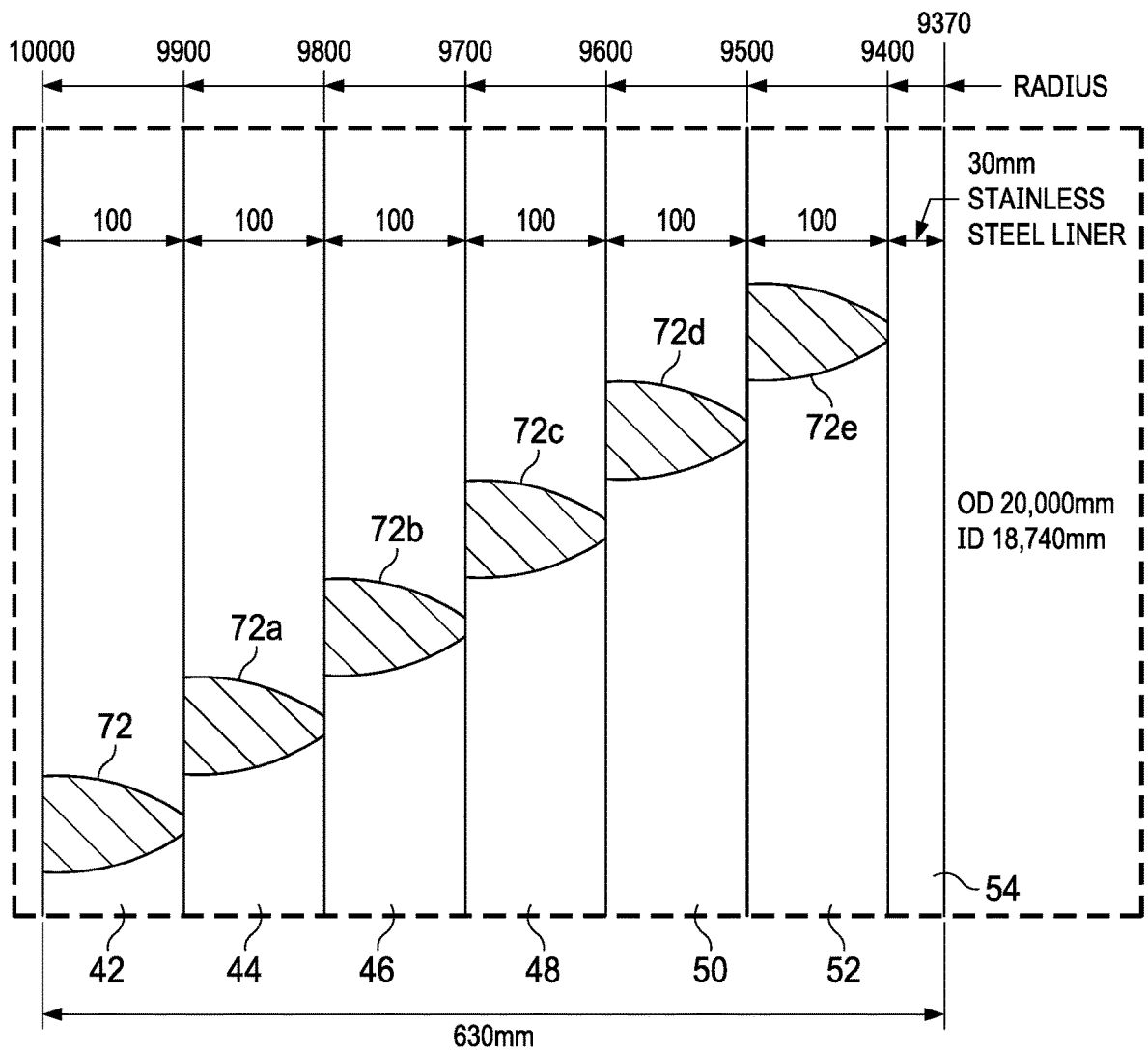
FIG. 5 is an enlarged cross-sectional view of a wall of the tank of FIGS. 1-4 taken at detail 5 of FIG. 3 showing welds in each layer.

Nesting multiple cylinders inside each other, each with a wall thickness of about, e.g., 100 mm (see detail A; FIG. 5), facilitates ease of fabrication of a cylinder having sufficient wall thickness to provide adequate provable resistance to crack growth.

The wall therefore consists of multiple layers, e.g., layers 42, 44, 46, 48, 50, 52, 54, such as 6 layers of 100 mm thick X80 steel with a liner that resists embrittlement such as a stainless-steel liner 54 that is 30 mm in thickness. The stainless-steel liner 54 is provided to prevent the X80 material from hydrogen embrittlement. Other possible liner materials that resist embrittlement are possible, including aluminum and plastic. Visible in FIG. 5 are seam welds, e.g., seam weld 72 for each of layers 42, 44, 46, 48, 50, 52, and 54, designated as seam weld 72 and 72a-e as shown in FIG. 5.

This nesting of cylinder layers is beneficial to the fracture mechanics problem as crack growth in a single cylinder becomes arrested since the stress at the crack tip diminishes. More importantly, the crack cannot jump the boundary to the adjacent layer due to lack of continuity.

With big tanks under such high pressure the energy stored is very large. Even though fatigue resistance can be demonstrated, the tanks of the invention ensure that, even if a crack developed, it could not progress beyond its critical length between inspections.

Some secondary advantages of the invention are that the deck stress in the ship 10 due to the design bending moment drops to about a third or so of what it would be in an equivalent sized tanker. This means that some steel weight reductions in the ship's structure may be possible. They have not been allowed for in the initial estimates of ship steel weights.

Additionally, the longitudinal stress in the 20-meter pipe tanks 40, 160 (due to the design wave and still water moment) is miniscule, as is the shear stress.

Cargo Containment Design

The containment design is governed (primarily) by two limit states. That of service (SLS) and that of fatigue.

If the ship 10 were to have a complete cycle of load-unload every 5 days, then over 30 years this amounts to 2,200 cycles.

The American Bureau of Shipping (ABS) requires that a factor of 10 be applied when assessing design life using S—N fatigue curves. Also, the curves used must be conservatively based on 3 standard deviations below the mean failure line, (as opposed to the more normal industry standard of 2).

For 250 bar the fatigue formula results in 24,000 cycles which is in excess of the 22,000 required.

Ship Principal Particulars

The principal characteristics of example vessel 10 are as follows:

| | |
|---|---|
| LOA | 340 m |
| Waterline | 325 m |
| Maximum Breadth | 48 m |
| Depth to Main Deck | 26 m |
| Loaded Draft | 12.0 m |
| Lightship Draft | 11.8 m |
| Loaded Displacement | 160,000 tonnes |
| Freeboard | 14.0 m |
| Cargo Weight | 2,000 tonnes |
| Cargo volume | 118,000 m$^3$ |
| Ship Steel | 22,000 tonnes of EH36 steel |
| Ship to Cargo volume ratio | 2.9:1 (average tanker is 1.5:1) |
| GM | 8.5 m |
| Roll Period | 11 seconds |
| Hull Inertia | 4300 m$^4$ |
| Hull Modulus | 330 m$^3$ |
| Maximum Deck Stress | 7 ksi (about 30% of allowable) |

Example Containment Design

| | |
|---|---|
| 250 bar | |
| Yield Stress: | 80 ksi |
| OD: | 20,000 mm |
| Wall Thickness: | 630 mm |
| Nominal hoop stress at 250 bar | 56 ksi |
| Nominal safety factor with respect to yield | 1.4 |
| Length: | 225 m (201 m + 12 m + 12 m) |
| Total pipe weight | 133,000 tonnes |
| (127,000 tonnes of 80 ksi steel plus 6000 tonnes of stainless steel) | |

Example Calculation of Allowable Pressure

The permissible SLS design pressure for safety class high, under the DNV Submarine Pipeline Systems code OS-F101 Clause D 400, is derived below. The operating pressure (MAOP) is then 95% of this value.

The formula for the permissible design pressure for the serviceability (yield) limit state is:

$$\text{Design Pressure} = 2 \times t_{min} \div (OD - t_{min}) \times \alpha_u \times f_y \times 2 \div 3^{0.5} \div \gamma_{sc} \div \gamma_m$$

Where:
$t_{min}$=the minimum wall thickness of the pipe at any point,
OD=the outside diameter
$f_y$=the minimum specified yield stress
$\alpha_u$=equals the material strength factor or 0.96
$\gamma_{sc}$=equals the safety class safety factor. In this case for the highest class it is 1.308
$\gamma_m$=equals the material safety factor.
Putting numerical values into the above formula yields: 250 Bar $$\text{Design Pressure} = 2 \times 24.8 \div (787.4 - 24.8) \times 80{,}000 \times 0.96 \times 2 \div 1.732 \div 1.308 \div 1.15 = 3835 \text{ psi. } (264 \text{ bar})$$

Multiplying by 0.95 gives an MAOP of 3642 psi. (251 bar)

Example Fatigue Assessment

ABS have indicated in their guidelines that a factor of 10 be used when assessing design life with the appropriate S—N curves, which are conservatively based on 3 standard deviations below the mean failure line (as opposed to the more normal industry standard of 2).

The relationship between the number of cycles and the stress range can be written as:

$$\text{Log}(N) = \text{Log}(C) - c\delta - m \text{Log}(F_{sr})$$

Where:
N=the predicted number of cycles to failure under the stress range $F_{sr}$
C=a constant relating to the mean S—N curve for that weld.
m=the inverse slope of the mean S—N curve.
c=the number of standard deviations below the mean
$\delta$=the standard deviation of Log (N)
Inserting numerical values into the equation yields the following:
250 Bar Class C Weld $$\text{Log}_{10}(N) = 14.034 - 3 \times 0.204 - 3.5 \text{ Log}(384) = 4.377$$

From which N equals $10^{4.377}$=24,000 cycles

In one embodiment, damage stability requirements are met primarily by the continuance inwards of some of the watertight bulkheads 30, 32 in the outer double hull side shell where they will make a watertight seal with the cylinders 40 and/or 160.

In one embodiment, compartmentalization within the storage tanks 40, 160 is achieved by introducing divisions into the long cylinders if required.

In one embodiment, the nested tanks are constructed by first installing the outer lower circular section, e.g., 68 of layer 42 (see, e.g., FIG. 4), and welded to the super structure. Then the rest of the lower semicircular portions of layers 44, 46, 48, 50, 52, and 54 will be seated under gravity. Preferably, there are no weld connections between the shells. Then the top inner semicircular section, e.g., 66, will be lowered on to the bottom inner section, e.g., 44, 46, 48, 50, 52, and 54, and the inner seam weld, e.g., 70, 72, will be completed from both sides. This then continues with single sided welding until the outer top section 66 is seam welded onto its counterpart via seam welds 70, 72, see FIG. 5, Detail A above.

The length of each section will depend on the cranage capacity of the yard. A 50 meter section would weigh about 1400 tonnes. The very high D/t ratios of the 100 mm thick half cylinders make them very easily alignable for seam welding by various combinations of kentledge, hydraulic and temperature means. The end caps 74, 144 are specifically designed with single curvature in order to assist forming and fit up.

Moss tanks for LNG require equatorial ring support. This is because their internal design pressure is so low that the resulting shell cannot self-support from beneath. However, in one embodiment, Applicant's tanks 40, 160 are e.g., 250 bar cylinders that have a working pressure some 500 or more times that of a Moss tank and as such are easy to support from beneath. This support also acts as the shear transfer mechanism to transfer bending moment to ship structure, such as the ship's deck 28 and bottom shell. Moss tanks are not typically integrated with the ship 10. Applicant's tanks 40, 160 are integrated completely and are the stiffest and strongest part of part of the ships structure. By welding the top and bottom of tank 40, 160 to ship structure, such as deck structure, tank 40, 160 becomes a major structural element of the ship, thereby adding to the strength of the ship. Perhaps the best analogy is that of a second world war submarine which has its upper deck attached as an appurtenance rather than a load carrying member. The main support for tanks 40, 160 comes from both horizontal and longitudinal girders. The transverse support will be from the transverse girders and the watertight bulkheads 30, 32 described above. The longitudinal girders (top and bottom) will also be used as shear transfer connections to the deck 28 and tank shell.

Figure 6:
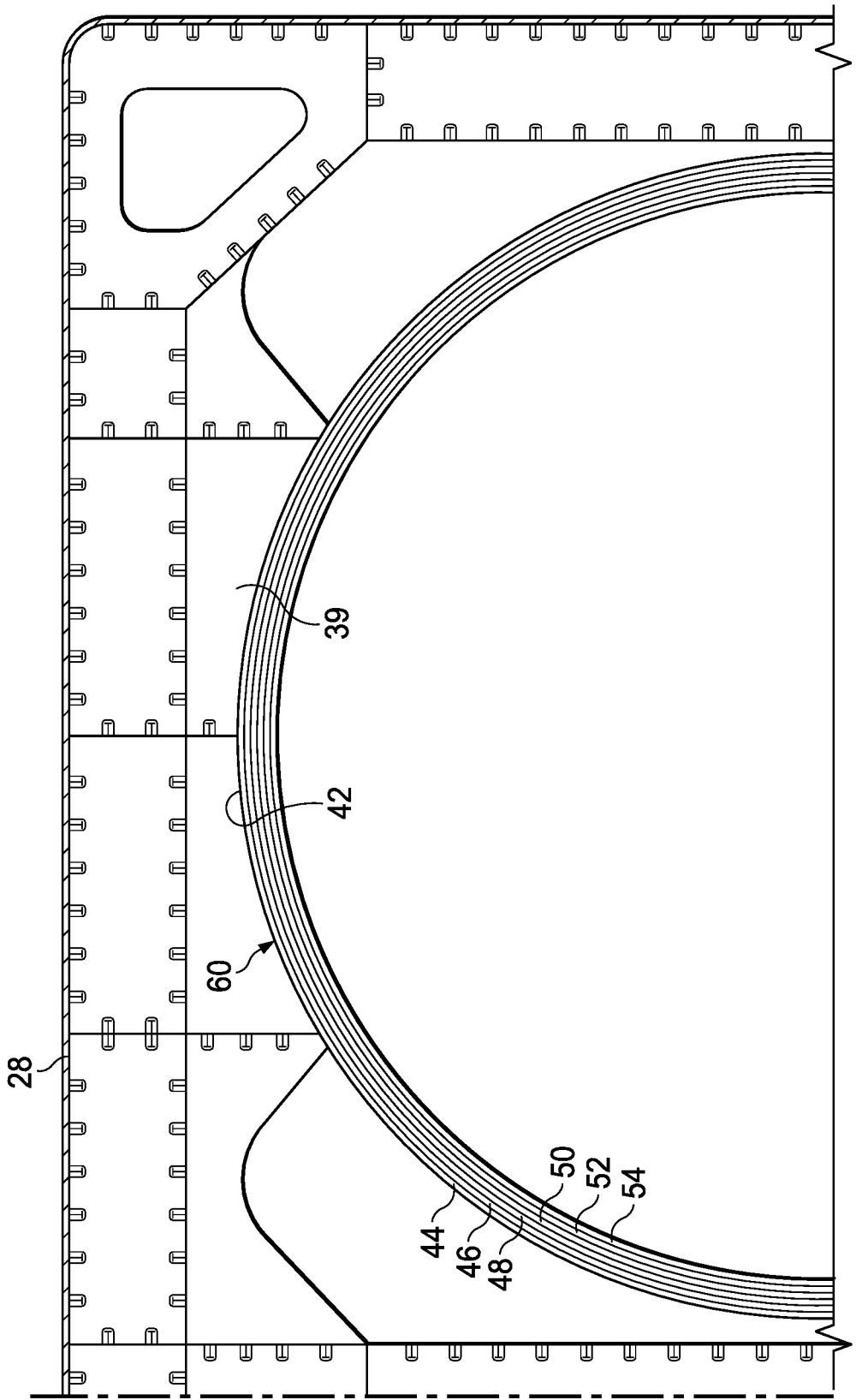
FIG. 6 is an enlarged alternative cross-sectional view of FIG. 3 wherein a top layer of the tank is connected to deck structure.
Figure 8:
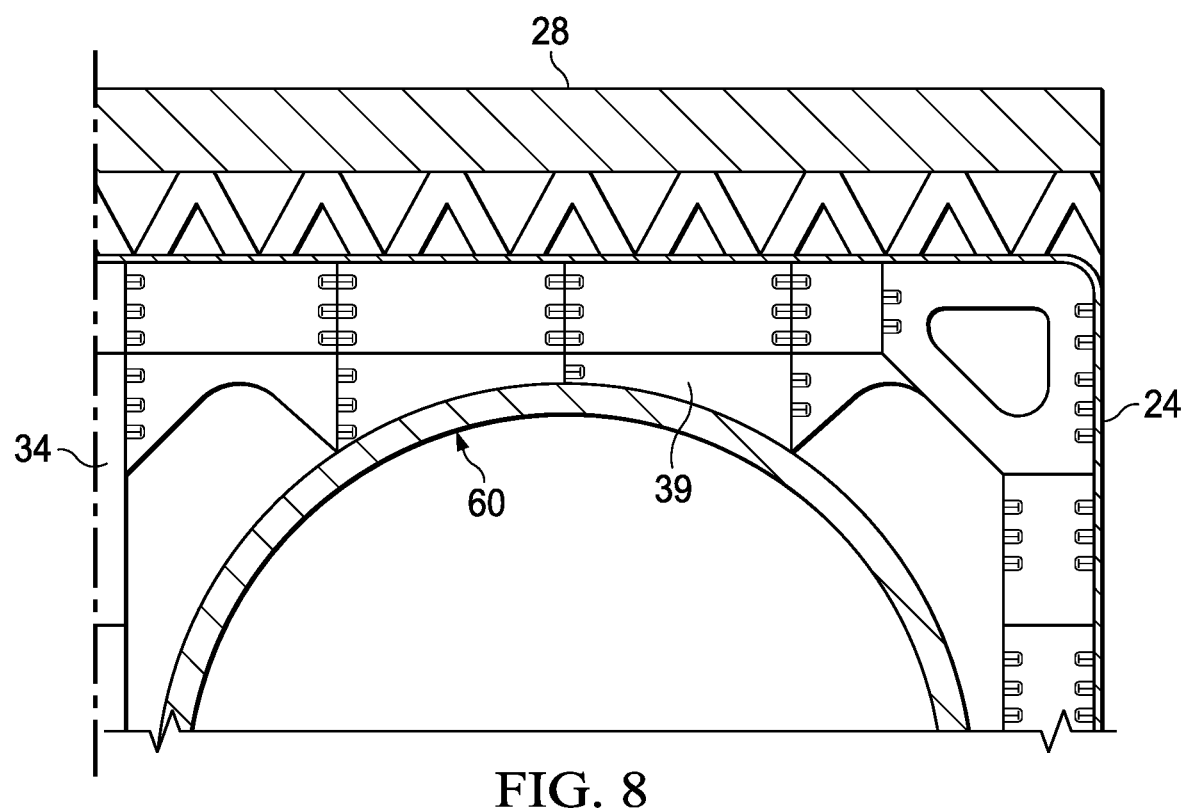
FIG. 8 is an enlarged alternative cross-sectional view of FIG. 3 showing an embodiment wherein the tank is supported by ship structure that is separate from deck structure.

As shown in FIG. 6, outer layer 42 of tank 40 may be connected to deck 28, e.g., by welding to support 39. Support 39 is shown in FIGS. 6 and 7 as being part of ship structure of deck 28. However, support 39 may be provided for supporting tank 40 as ship structure that is separate from deck 28 (see, e.g., FIG. 8). Sagging of layers 42, 44, 46, 48, 50, 52 and 54 is prevented by welding outermost layer 42 to a support 39 or to girders of top deck 28 of ship 10. The connection to deck 28 supports outermost layer 42 and prevents it from sagging. Since top layer 42 does not sag, inner layers 44, 46, 48, 50, 52 and 54 cannot deform and sag since they are nested within outer layer 42 whose geometry is constrained by attachment to top deck 28.

As shown in FIG. 7, expansion space 43 and 45 may be provided between tank 60 and structural shell portion 24 of hull 20 and between tank 40 and longitudinal bulkhead 34, respectively. Expansion gaps or spaces 43 and 45 prevent tank from 60 damaging ship hull 20 as tank 40 expands during pressurization.

Preferably, the nested tanks are not connected to each other in any way. They are tubes within tubes. If there were no ends and they were perfectly constructed then they would slide out. Imagine the nested tube spanning as a beam from end to end under self-weight giving a simple bending moment. The stress and deflections are based on the inertia of the tubes. If the tubes are in close contact and there are no gaps the overall inertia of the tubes is the exact same as if they were solid. It is completely different than having multiple layers of plate on top of one another. The inertia of the nested tubes is calculated as follows:

$$\text{Inertia} = \pi/64(D_1^4 - D_2^4 + D_2^4 - D_3^4 + D_3^4 \ldots) = \pi/64 (204 - 18.744) = 1800 \text{ m}^4$$

With two tanks this is 3600 m⁴. Total hull and cylinder inertia acting together is 4300 m⁴ so about 80% of the ship's stiffness comes from the cargo tanks 40, 160.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least I" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method of constructing a multi-layer tank within a hull of a ship comprising the steps of:
    installing a semi-cylindrical outer lower section in the hull and affixing said outer lower section to said hull;
    installing one or more semi-cylindrical lower sections within said outer lower section, said semi-cylindrical lower sections comprising an inside lower section;
    installing a semi-cylindrical inside upper section on said inside lower section and welding said inside upper section to said inside lower section on both sides for forming an inside cylinder;
    installing one or more semi-cylindrical upper sections for mating with counterpart ones of said semi-cylindrical lower sections and welding each mated pair on both sides for forming a plurality of nested cylinders;
    installing end caps on each of said plurality of nested cylinders for forming a plurality of nested tanks.

* * * * *